Figure 1:
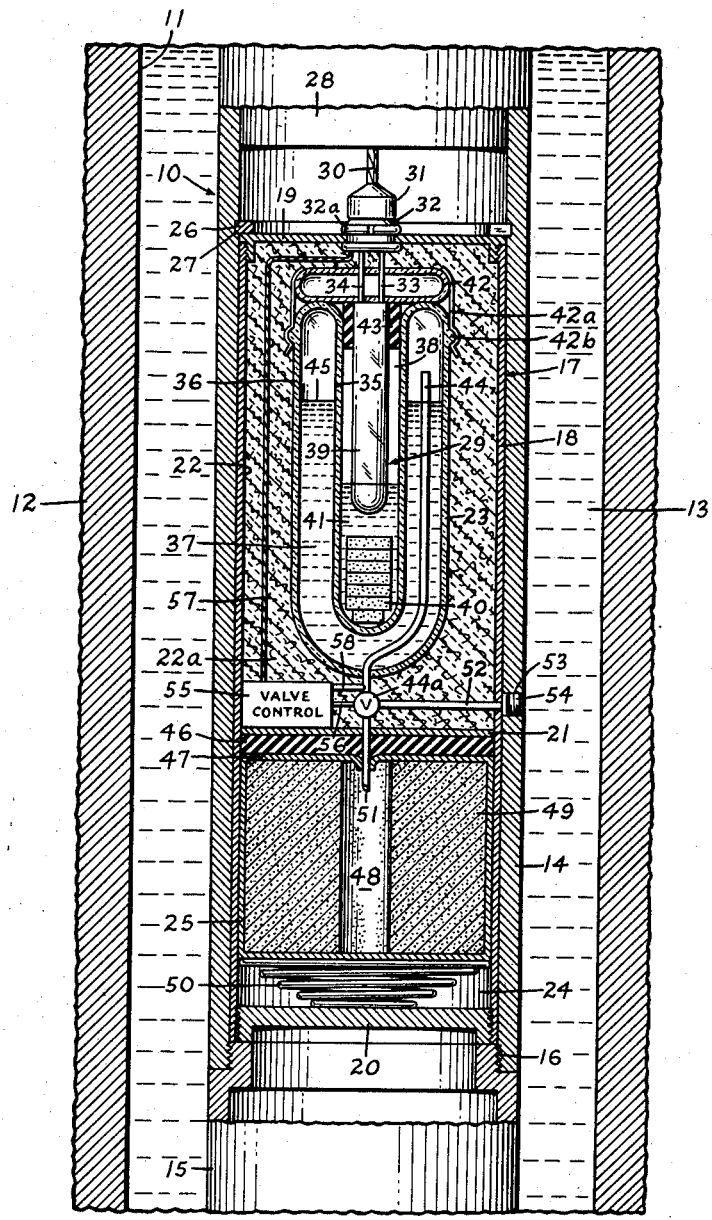

July 7, 1959

S. SOLOWAY 2,893,213

REFRIGERATING METHODS AND APPARATUS

Filed Nov. 22, 1954

2 Sheets-Sheet 1

FIG.I.

INVENTOR
SIDNEY SOLOWAY
BY
Campbell, Brumbaugh, Free + Graves
HIS ATTORNEYS

July 7, 1959 S. SOLOWAY 2,893,213
REFRIGERATING METHODS AND APPARATUS
Filed Nov. 22, 1954 2 Sheets-Sheet 2

INVENTOR
SIDNEY SOLOWAY
BY
Campbell, Brumbaugh, Free & Graves
HIS ATTORNEYS

United States Patent Office 2,893,213
Patented July 7, 1959

2,893,213

REFRIGERATING METHODS AND APPARATUS

Sidney Soloway, Norwalk, Conn., assignor, by mesne assignments, to Schlumberger Well Surveying Corporation, Houston, Tex., a corporation of Texas Application November 22, 1954, Serial No. 470,167

11 Claims. (Cl. 62—4)

This invention relates to methods and apparatus for cooling various instruments, and has particular reference to the refrigeration of such instruments in high temperature environments at remote locations.

It is common practice to obtain information from remote and relatively inaccessible positions by measuring instruments which relay signals representative of desired measured values back to a fixed station for recording. Often such instruments are subjected to adverse environmental conditions which impair the operation of complex electronic components contained therein. This is especially true with respect to those components sensitive to temperature variations and extremes of temperature.

Examples of such measuring instruments used in high temperature environments are those employed with aerial missiles and in well logging. The present practice in well logging for instance, includes electrical and radioactivity measurements at depths in a bore hole where temperatures may reach and exceed 320° F. The refinement of equipment to accomplish these measurements, especially in deep bore holes, has been hindered by the high temperatures encountered. Thus, the limited space available in a housing that must be lowered into a bore hole dictates the use of miniature components such as transistors and printed circuits, but these components must be maintained at temperatures well below 320° F. to insure satisfactory operation.

The space limitations which make the sensitive miniaturized electronic components desirable also present problems when suitable temperature-conditioning apparatus must be provided within a housing. These space limitations together with the high ambient temperatures found in a bore hole preclude the use of conventional refrigerating systems. Moreover, the importance and expense of measurements taken by these measuring instruments require that the temperature-conditioning apparatus upon which such measurements depend must be of simple and rugged construction to provide reliable cooling during selected periods.

Accordingly, it is an object of the present invention to provide for the refrigeration of compactly mounted instruments operating in high ambient temperatures at relatively inaccessible locations.

Another object of the invention is to provide for automatically controlling the refrigeration of compactly mounted instruments that are subjected to elevated temperatures at relatively inaccessible locations.

Yet another object of the invention is to provide for the refrigeration of measuring instruments in a housing adapted to be lowered into a bore hole.

These and further objects of the invention are accomplished by placing a liquid refrigerant in an evaporator selectively in vapor communication with an absorbent. The absorbent comprises a substance that possesses the characteristic of reacting with the refrigerant vapor to produce a reaction product which will not decompose when heated to high temperatures in excess of that normally prevailing at the surface of the earth. Preferably, the heat from a high temperature environment aids in initiating the reaction. With the evaporator in vapor communication with the absorbent, the refrigerant continuously passes to the vapor phase and, due to its heat of vaporization, removes heat from areas adjacent to suitably disposed portions of a measuring instrument which require cooling.

For reliability of operation, the absorbent is preferably contained in replaceable cartridges adapted to be quickly and easily connected in the refrigerating system so as to place the system in optimum condition prior to taking measurements.

If desired, the impingement of the refrigerant vapors on the absorbent may be automatically controlled in accordance with the temperature of a point adjacent to the refrigerant or in accordance with the vapor pressure of the refrigerant, for example.

Figure 2:
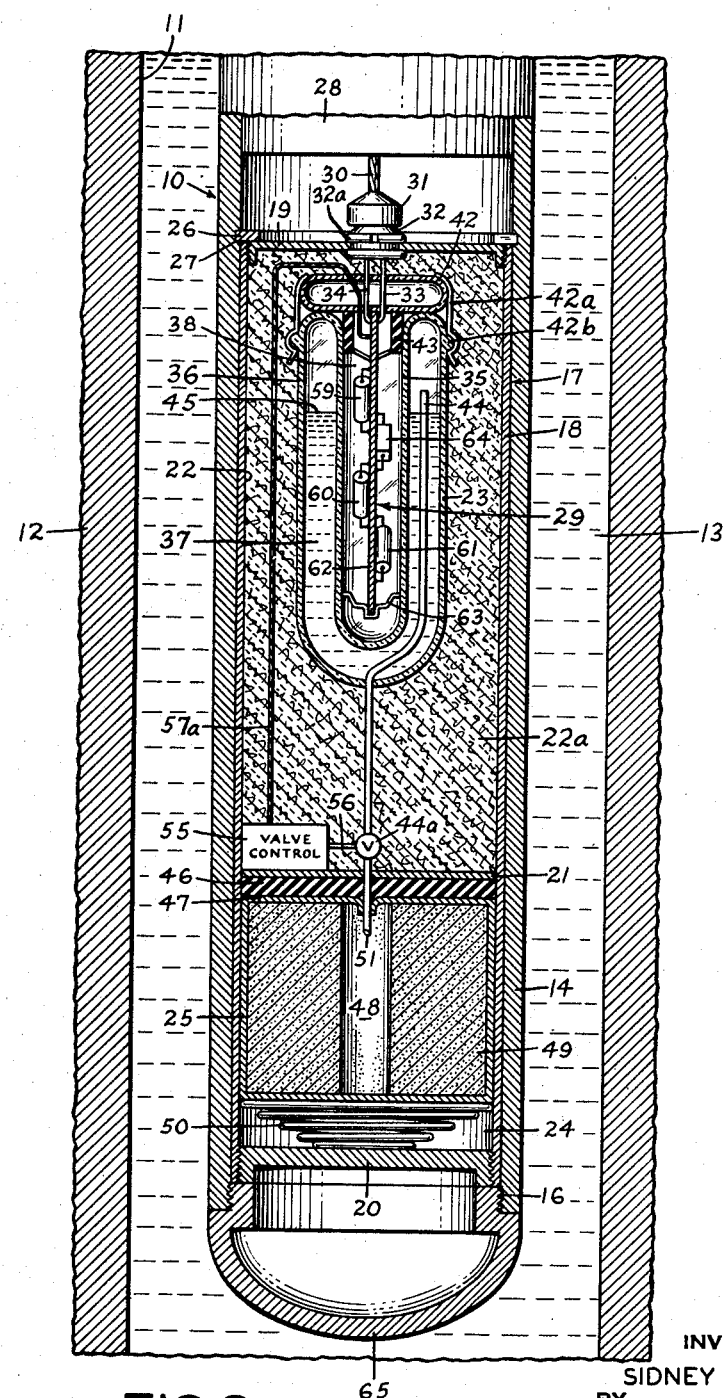

Further objects and advantages of the invention will be more readily understood from the following detailed description, taken in conjunction with the accompanying drawings in which:

Fig. 1 is an elevation, partly broken away and partly diagrammatic, of a housing carrying a refrigerating system constructed in accordance with the present invention; and Fig. 2 is an elevation similar to Fig. 1 illustrating a modified refrigerating system in accordance with the invention.

In a typical form of the invention shown in Fig. 1, a housing 10 is suspended in a bore hole 11 by a cable (not shown) extending to the surface of the earth. Means are provided for transmitting desired information from the housing 10 to a measuring station at the earth's surface. The housing 10 may experience in the bore hole 11 traversing earth formations 12 temperatures ranging from the temperatures prevailing at the earth's surface to temperatures on the order of 320° F. It will be understood that such conditions may exist for a high speed aerial missile as well as for a logging device as shown and described herein.

At least for the first 10,000 feet of depth or less, well liquid 13 such as a drilling liquid may rise in temperature beyond that at the earth's surface by an average of 1° F. for every 100 feet of depth, with wide regional variations observed in this average. Accordingly, as the housing 10 is lowered into a deep bore hole, its temperature will increase with that of the surrounding well liquid to temperatures well above the stable operating limits of certain electronic circuit elements.

Forming the housing 10, are hollow cylindrical sections 14 and 15 connected by suitably cut threads 16 on their lower and upper end portions, respectively. The sections 14 and 15 are constructed from a heat conducting material capable of withstanding high drilling fluid pressures. Snugly fitted within the section 14 is a cylindrical casing 17 containing a refrigerating system embodying the principles of the present invention and which will be described in detail hereinafter. The casing 17 may comprise a sleeve 18 having an apertured cap 19 threaded on its upper end, another cap 20 threaded on its lower end and a fixed transverse partition 21 intermediate its ends. By means of the partition 21, the casing 17 is divided into an upper chamber 22 for receiving an evaporator 23 and a lower chamber 24 for receiving an absorber 25 in the form of a cartridge. The casing 17 is retained by a split ring 26 in an annular recess 27 at its upper end and by the threaded end portion of the section 15 at its lower end.

Mounted above the casing 17 in the section 14 is a measuring instrument 28 having temperature sensitive elements 29 positioned inside the casing 17 in a manner described hereinafter. Means joining the instrument 28 to the temperature sensitive elements 29 comprise a rigid cable 30 terminated by a connector 31, a complementary connector 32 secured by a split ring 32a in the apertured cap 19 and a pair of cables 33 and 34 carrying any desired number of conductors leading to the elements 29.

It will be apparent that by unscrewing the sections 14 and 15, the casing 17 may be removed from the housing 10, the connectors 31 and 32 permitting a ready disconnection of the electrical circuitry connecting the measuring instrument 28 outside the casing 17 and the temperature sensitive elements 29 inside the casing.

Both to resiliently support and to thermally insulate the evaporator 23 from the casing 17 and the housing 10, it is surrounded by a packing 22a composed, for example, of matted glass fibers bonded together in a form-sustaining mass or of a resilient silicone foam. Such insulation results in considerably decreasing the rate of heat transfer from the fluid 13 in the bore hole 11 inwardly through the housing 10, the casing 17 and the evaporator 23 to the elements 29. To supplement the temperature moderating effect of the insulation 22a, the evaporator 23 refrigerates the temperature sensitive elements 29 to effectively maintain their temperature within the desired limits.

To this end, the evaporator 23 is given the form of a tubular jacket with inner and outer envelopes 35 and 36, respectively, joined at their extremities to provide a sealed enclosure for a liquid refrigerant 37. The envelopes 35 and 36 are preferably formed from a rugged, heat stable material such as a ceramic or glass. The inner envelope 35 opens upwardly to form a recess 38 receiving the temperature sensitive elements 29 of the measuring instrument 28 carried within the housing 10. The elements 29 may comprise, for example, a radiation detector including an electronic photomultiplier tube 39 disposed in the recess 38 with its lower end immersed together with a plurality of scintillation crystals 40 in a fluid 41 having a suitable refractive index, for example, mineral oil. The fluid 41, in addition to optically coupling the crystals 40 to the tube 39, also serves as a thermal transfer medium in the manner of a secondary refrigerant to render uniform the temperatures in the recess 38.

The photomultiplier tube 39 is conveniently mounted on an insulating cover 42 positioned to abut the envelope 35 and 36 at their juncture by means of snap fasteners 42a engaging an annular shoulder 42b on the envelope 36. In addition, a resilient bushing 43 serves as a seal to prevent leakage of the fluid 41. With this arrangement, the temperature sensitive elements 29 including the electronic photomultiplier tube 39 are completely surrounded in the recess 38 which results in these elements being held at substantially the temperature of the refrigerant 37.

In order to provide refrigeration of the recess 38, refrigerant vapors are passed through a tube 44 projecting above liquid level 45 of the refrigerant 37 and communicating with the absorber cartridge 25. In providing vapor communication between the evaporator 23 and the cartridge 25, the tube 44 passes in sealed relation through the outer envelope, 36 a valve 44a, the partition 21, a sealing pad 46 and a penetrable cover 47 on the cartridge 25 into a passageway 48 formed within a porous annular block of an absorbent 49.

Since it is possible to easily remove the casing 17 from the housing 10 by unscrewing the sections 14 and 15, a fresh refrigerating system including the temperature sensitive elements 29 of the measuring instrument 28 may be inserted in the housing 10 prior to each measuring operation. However, a more practical and economical arrangement for placing the refrigerating system in a fresh condition prior to each use is achieved by rendering the cartridge 25 readily replaceable. To this end, a spring 50 acts between the lower casing cap 20 and the lower face of the cartridge 25 to press it upwardly against the sealing pad 46. The cover 47 of the cartridge 25, which is ruptured by the entry of a sharp stem portion 51 into the passage 48, will then be sealed by the pad 46.

In the event that the pad 46 does not completely exclude air during replacement of the cartridge 25, an exhaust tube 52 extends from the valve 44a to a convenient position exterior to the casing 17 to permit evacuation of the cartridge 25 and the evaporator 23, upon suitable operation of the valve 44a. In this instance, the tube 52 extends transversely through the sleeve 18 adjacent to an opening 53 in the section 14 adapted to be closed by a plug 54. Suitable means for producing a vacuum (not shown) may be connected to the tube 53 through the opening 53 for drawing a desired degree of partial vacuum. While the pressure in the refrigerating system is not critical, it may be maintained for satisfactory operation at .01 mm. mercury, for example, this value being dependent on the type of refrigerant 37 employed. With at least one of the substances which would serve as a suitable refrigerant 37, satisfactory operation will be obtained with the system placed under pressure.

For reliable operation of many temperature sensitive elements in electronic measuring instruments, it is not only necessary to protect such elements from excessive temperatures, but it is also expedient to hold them at a fairly constant temperature. Accordingly, a valve control 55, which may be of any conventional type, is connected by a suitable linkage 56 to the valve 44a. For example, the valve control 55 may comprise a solenoid actuated by an energizing signal carried over a cable 57 extending through the connectors 31 and 32 and the cable 30 to the cable (not shown) supporting the housing 10. The valve control 55 may drive the valve 44a through several selectable positions including a closed and an open position for the tube 44 and a position connecting the tube 44 with the tube 52. In addition to this arrangement, the valve control 55 may also incorporate a suitable automatic metering arrangement governed by the vapor pressure of the refrigerant 37, the temperature within the recess 38 or any other parameter measurable by well known means, to regulate the flow of refrigerant vapors from the evaporator 23 to the cartridge 25. For example, a tube 58 may join the tube 44 to the valve control 55 if automatic metering in response to the refrigerant vapor pressure is desired.

For remote operation of the valve 44a, a measuring station (not shown) at the earth's surface may be connected through a conventional supporting electric cable (not shown) with the housing 10 for supplying the valve control 55 with actuating signals over the cable 57. It should be understood that if completely automatic operation is desired, the valve control 55 may carry a power supply such as a battery permitting elimination of the cable 57.

In view of the very high temperatures to which the housing 10 is exposed in the bore hole 11, such temperatures reaching in some instances values on the order of 320° F., refrigerants and absorbents previously employed in refrigerating systems operating at normal temperatures have been found inefficient and generally unsuitable for use in the present system. For effective refrigeration at these elevated temperatures with an efficient use of space, a refrigerant and absorbent must be used that react at temperatures ranging from 80° F. to 320° F. to produce a solid or liquid reaction product which is not decomposed at bore hole temperatures.

A preferred refrigerant is water while a preferred absorbent is an alkaline earth oxide. These oxides react exothermically with water vapor at temperatures above normal room storage temperatures and up to and well above 320° F., this reaction producing a reaction product which is not decomposed at temperatures up to the order of 1075° F. For example, a preferred alkaline earth oxide is calcium oxide which reacts with water vapor as follows:

$$CaO + H_2O \rightarrow Ca(OH)_2$$

The water refrigerant will vaporize within the stable operating range of the temperature sensitive elements 29 and to aid such vaporization, the evaporator 23 may be evacuated to a suitable partial vacuum, as described above. Thus, as the temperature of the bore hole fluid 13 increases, the absorbent and refrigerant will become heated. This will tend to aid the reaction of the water vapor and alkaline earth oxide and since the reaction is exothermic, it will accelerate itself and in a short interval become substantially independent of the bore hole temperature.

In addition to the above reactions, there are several other classes of reactions which can be used for refrigeration in high temperature environments such as a bore hole as follows:

(1) Reactions of ketones or aldehydes which absorb heat by vaporizing and react remotely with moist sodium bisulfite to form the bisulfite salt that is stable at bore hole temperatures. As an example, acetaldehyde reacts with sodium bisulfite to give the stable addition product in the equation below:

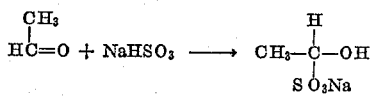

(2) Reactions of a liquid organic acid such as formic or acetic acids with a moist basic anion-exchange resin to form a salt stable at the high temperatures described above. For example, melamine-formaldehyde-guanidine resins, phenol-formaldehyde-polyamine resins, and acetone-formaldehyde-polyamine resins may be employed.

(3) Reaction of ammonia evaporated from an ammonium hydroxide solution in the evaporator and directed to sulfuric acid disposed on a slightly wet mat of asbestos within the absorber, thereby to cool the evaporator.

(4) Reactions between ethylene, acetylene or isobutylene and sulfuric acid on asbestos under pressure. The reaction of isobutylene is typical and follows:

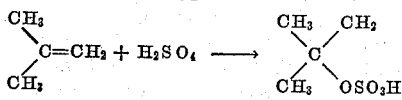

In this example, the refrigerant isobutylene is under pressure, the valve 44a being controlled to maintain the desired pressure in the evaporator 23.

Each of the named refrigerants will vaporize in the stable operating range of sensitive electronic components and will react with the corresponding absorbents to form reaction products which will not decompose at temperatures up to and even exceeding 320° F. These examples are given, not by way of limitation, but to illustrate a variety of refrigerant-absorbent sets or groupings which are peculiarly suited to employment in refrigerating systems operating under high temperature conditions.

To prepare the cooling system of this invention for operation, the casing 17 is removed from the housing 10 and placed in an inverted position with the absorber cartridge 25 removed and the valve 44a closed. The stem portion 51 of the tube 44 is then connected to a source of the refrigerant 37, after entrapped air is removed from between the envelopes 35 and 36, and the refrigerant 37 will flow by gravity into the evaporator 23 when the valve 44a is opened. After the evaporator 23 is sufficiently filled with the refrigerant 37, the valve 44a may be closed and a fresh cartridge 25 of absorbent pressed into position. In the event that air pressure in the system rises excessively and the refrigerant is adapted to vaporize under reduced pressure, the tube 52 may be connected to evacuating means until a suitable partial vacuum is drawn.

With a fresh cartridge 25 in position, the casing 17 may be urged upwardly into the housing forcing the connector 32 to join the connector 31. After replacing the section 15, the housing 10 may be lowered into the bore hole 11.

Subsequently, when the temperature rises to the extent that refrigeration becomes necessary, such as at a given depth in the bore hole, the valve control 55 is actuated to place the absorbent 49 and the evaporator 23 in vapor communication through the tube 44. Of course, this may occur automatically if vapor pressure responsive elements or temperature responsive elements are employed in the valve control 55.

It will be evident from this description that the refrigerating system will require but slightly more space than that required by the refrigerant 37 and the absorbent 49 needed for the desired refrigerating capacity. Both the refrigerant 37 and the absorbent 49 and the means for containing them may be of such inexpensive nature that they can be discarded upon saturation of the absorbent.

Alternatively and with even greater facility and economy, the saturated absorbent cartridge 25 alone may be discarded and replaced with a fresh cartridge. In either event, no power is required for the operation of the refrigerating system other than that which may momentarily be required to actuate the valve control 55 or evacuate the system prior to its use. This completely eliminates the problems involved in conducting power to the refrigerating system through a conventional electric cable.

In particular, the use of water as a refrigerant and calcium oxide as an absorbent results in an effective refrigerating system at elevated temperatures on the order of 320° F. Water is, of course, the least expensive of refrigerants and has an exceptionally high heat of vaporization to meet the space limitations here involved. Calcium oxide, on the other hand, is abundant and inexpensive and easily prepared by firing slaked lime with a binder, for example, to provide the porous annular absorbent block 49 with a sufficiently large reactive surface. Since the heat of vaporization for water is 563 calories per gram and under suitable conditions approximately 3.1 grams of calcium oxide will absorb 1 gram of water at a high rate, it will be appreciated that high refrigerating efficiency may be provided over considerable periods of time utilizing apparatus of very limited dimensions. Likewise, it will be apparent that with water as the refrigerant and calcium oxide as the absorbent, several cartridges of absorbent may be saturated before the need arises for replenishing the supply of refrigerant. Calcium oxide offers the further advantage of having an extremely low rate of absorption at room temperature for stoppered storage while having a high rate of absorption at the elevated temperatures found in such environments as a bore hole.

In instances where a diminished transfer of heat from the absorbent cartridge 25 to the evaporator may be desired, a further embodiment of the invention illustrated in Figure 2 may be employed in which elements similar to those in Fig. 1 are designated by like reference numerals. The temperature sensitive elements 29 of the measuring instrument 28 here comprise a miniaturized electronic circuit including a battery 59, a transistor 60, and a selenium rectifier 61. These components are mounted on a printed circuit panel 62 which is fastened to the cover 42 in lieu of the photo-multiplier tube 39 of Fig. 1. A centering spring 63 is carried at the lower end of the panel 62 to bear resiliently against the inner walls of the envelope 35. In addition, a temperature sensitive device 64 such as a thermistor or other device having a desired temperature characteristic may be carried on the panel 62 and appropriately connected to the valve control 55 by a conductor 57a to provide for thermostatic control of the temperature in the recess 38.

Fig. 2 also shows the absorber cartridge 25 spaced remotely from the evaporator 23 so that it is adjacent to the lower end of the housing 10 to facilitate heat transfer thereto. The section 15 is thus replaced with a lower end cover 65 enclosing the housing 10. With this arrangement, heat developed by the exothermic reaction of the refrigerant 37 and the absorbent 49 will be discharged into the drilling liquid 13 remote from the evaporator 23 to reduce the rate of heat flow thereto. This is especially true when the housing 10 is being raised through the bore hole 11 during the course of measurements.

It will be understood that the above-described embodiments of the invention are illustrative only and modifications thereof will occur to those skilled in the art. Therefore, the invention is not to be limited to the specific apparatus disclosed herein but is to be defined by the appended claims.

I claim:

1. A method of refrigerating a measuring device at least partially surrounded by a refrigerating liquid in an elevated temperature environment comprising the steps of moving the measuring device from a normal temperature environment into and through an environment of increasingly higher temperatures, directing vapor released from the liquid by the increasing temperature away from the measuring device to an absorbent, exothermically reacting the directed vapor with the absorbent to form a reaction product that does not decompose at the temperatures in the environment, the elevated temperatures aiding initiation of the reaction, regulating the flow of vapor to the absorbent to maintain the temperature of the measuring device substantially constant, the absorbent being moved through the environment with the measuring device to dissipate the heat of reaction transferred from the absorbent to the environment away from the device.

2. In apparatus for obtaining measurements at high temperatures, a measuring instrument, an evaporator proximate to at least a portion of said instrument for cooling said portion, a refrigerant composed of water in said evaporator, an absorber in vapor communication with said evaporator, and an absorbent in said absorber composed of an alkaline earth oxide.

3. In apparatus for obtaining measurements at high temperatures, a measuring instrument, an evaporator proximate to at least a portion of said instrument for cooling said portion, a refrigerant composed of water in said evaporator, an absorber containing an absorbent composed of an alkaline earth oxide, duct means joining said evaporator to said absorber, and means for controlling the flow of water vapor through said duct means.

4. In apparatus for obtaining measurements at high temperatures, a measuring instrument, an evaporator proximate to at least a portion of said instrument for cooling said portion, a refrigerant composed of water in said evaporator, an absorber containing an absorbent composed of an alkaline earth oxide, duct means joining said evaporator to said absorber, temperature sensitive means adjacent to said portion of said instrument, and control means responsive to said temperature sensitive means for controlling the flow of the water vapor through the duct means.

5. A refrigerating system for cooling a temperature sensitive device in a pressure resistant housing adapted to be lowered into a bore hole comprising an evaporator at least partially surrounding the device in an insulated recess in the housing, water in the evaporator, an absorbent carried by the housing, duct means joining the evaporator to the absorbent, and means for controlling the flow of the water vapor through the duct means, said absorbent reacting with the water vapor to produce a reaction product which will not decompose at bore hole temperatures.

6. Apparatus as defined in claim 5 wherein the absorbent comprises an alkaline earth oxide.

7. Apparatus as defined in claim 6 wherein the alkaline earth oxide comprises calcium oxide, and means for providing a partial vacuum in the container.

8. A rechargeable refrigerating system for cooling a temperature sensitive device in a pressure resistant housing adapted to be lowered into a bore hole comprising an evaporator at least partially surrounding the device in an insulated recess in the housing, a liquid refrigerant vaporizable at bore hole temperatures, a disposable cartridge containing an absorbent, means for placing said cartridge in said housing in vapor communication with said evaporator, said absorbent reacting with the refrigerant vapor to produce a reaction product which will not decompose at bore hole temperatures.

9. Apparatus as defined in claim 8 wherein the refrigerant comprises water and the absorbent comprises an alkaline earth oxide.

10. A method of refrigerating an instrument which is at least partially surrounded by a refrigerating liquid comprising the steps of moving the instrument from a normal temperature environment into and through an environment of increasingly higher temperatures, directing vapor released from the liquid by the increasing temperature away from the instrument to an absorbent, and initiating and continuing a reaction between the directed vapor and the absorbent as the temperature of the environment increases to form chemically a reaction product which is stable at the maximum temperature to be encountered.

11. A rechargeable refrigerating system for cooling a temperature sensitive device in a pressure resistant housing adapted to be lowered into a bore hole comprising an evaporator at least partially surrounding the device in an insulated recess in the housing, a refrigerant composed of water in the evaporator, a disposable cartridge containing an absorbent composed of an alkaline earth oxide sealed by a penetrable cover at one end thereof, a tube for placing said cartridge in vapor communication with the evaporator extending from the evaporator, means formed on the end of the tube remote from the evaporator to penetrate the cartridge cover upon insertion of the cartridge into the housing, said absorbent reacting with the refrigerant vapor to produce a reaction product which will not decompose at bore hole temperatures.

References Cited in the file of this patent

UNITED STATES PATENTS

| | | |
|---|---|---|
| 1,467,462 | Codelli | Sept. 11, 1923 |
| 1,729,083 | Miller et al. | Sept. 24, 1929 |
| 2,122,161 | Smith | June 28, 1938 |
| 2,433,554 | Herzog | Dec. 30, 1947 |